Patented Aug. 9, 1938

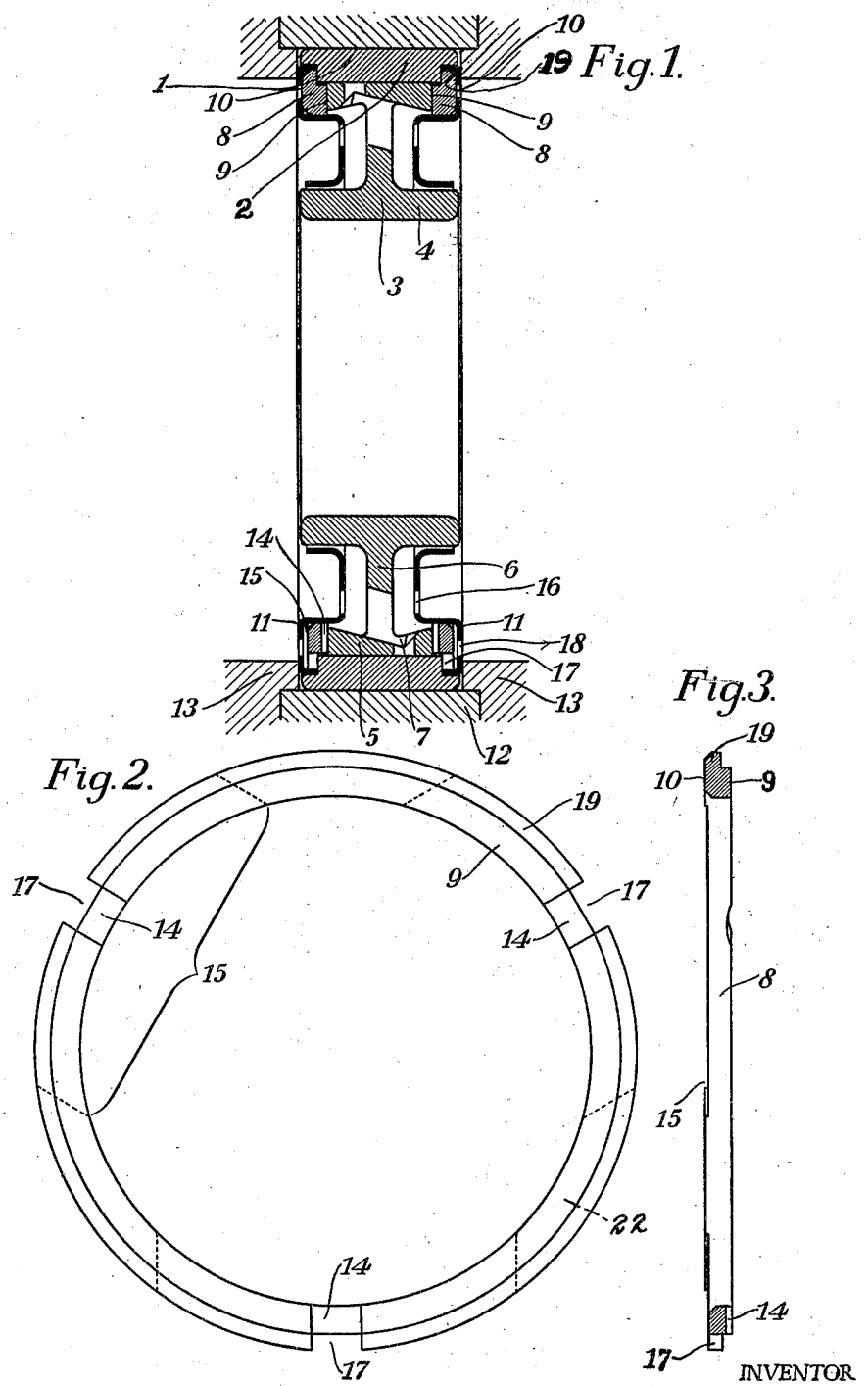

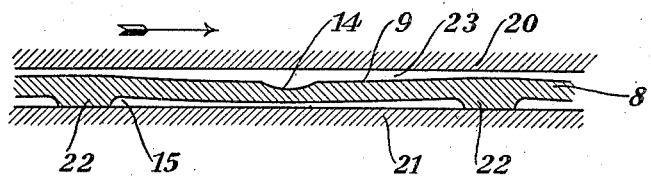
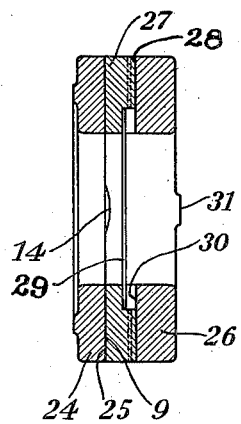
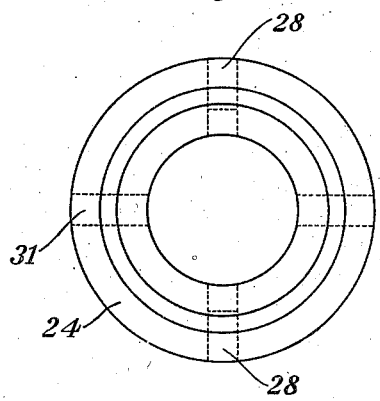
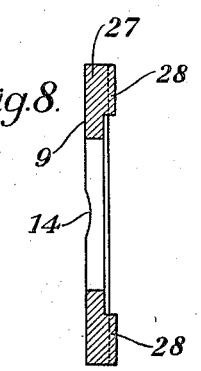
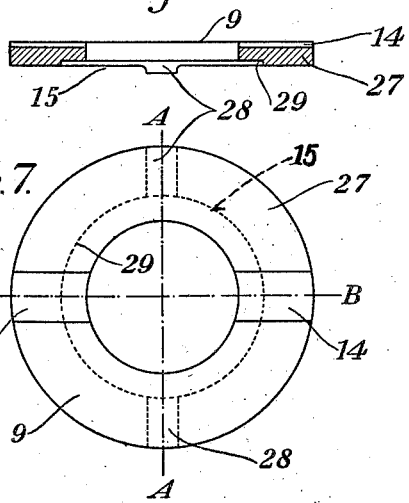

2,126,688

UNITED STATES PATENT OFFICE 2,126,688

PLAIN BEARING

Nils Arvid Palmgren, Goteborg, Sweden, assignor to Aktiebolaget Svenska Kullagerfabriken, Goteborg, Sweden, a corporation of Sweden Application November 13, 1935, Serial No. 49,466
In Sweden April 16, 1935

12 Claims. (Cl. 308—160)

This invention relates to plain bearings for taking thrust loads or combined radial and thrust loads. The bearing comprises a pressure ring for taking the thrust load, said pressure ring being provided with a sliding surface on one side and a supporting surface on the other side. It is characterized substantially thereby that recesses are provided pairwise in the sliding surface and the supporting surface, which recesses extend over the whole radial width of the pressure ring, and of which the recess in the supporting surface has a substantially greater peripheral extension than that of the corresponding recess of the sliding surface.

The invention is illustrated in the accompanying drawings in which

Figure 1 is a section in an axial plane of a bearing according to one embodiment of the invention.

Figure 2 is an end view of the annular bearing member for taking the thrust load.

Figure 3 is a section in an axial plane of the ring in Figure 2.

Figure 4 shows in diagrammatic form the elastic deformation of the pressure ring under thrust load during the rotation of the bearing.

Figure 5 is a section in an axial plane through a thrust bearing proper, according to one embodiment of the invention.

Figure 6 is a view in a plane of the bearing according to Figure 5.

Figure 7 is a view in a plane of the pressure ring of the bearing according to Figures 5 and 6.

Figure 8 is a section along the line A—A in Figure 7, and

Figure 9 is a section along the line B—B in Figure 7.

The bearing illustrated in Figure 1 comprises an outer ring 1 with an internal cylindrical sliding surface 2, and an inner ring 3 of I-section, the inner flange 4 of which is adapted to be mounted on a shaft. The outer flange 5 has an external cylindrical sliding surface, mating with the sliding surface 2. Channels 7 are provided through the web 6 and the outer flange 5 to supply lubricant to the sliding surface 2. The side edges of the outer flange 5 are surface ground and serve as sliding surfaces for transmitting thrust bearing loads.

The thrust is taken by a pressure ring 8. This ring has on one side, a plane sliding surface 9 bearing against the side of the outer flange 5 of the inner ring 3. On the other side the ring has a supporting surface 10, bearing axially against a side disc 11. This side disc 11 is centered by the outer ring 1 but bears axially against the side cover 13 of the bearing housing 12 enclosing the bearing. The ring 8 is provided with a flange 19 which is gripped between the side disc 11 and the outer ring 1 by means of the housing covers 13. Through this arrangement the ring 8 is prevented from following the rotation of the inner ring 3.

The ring 8 is provided with grooves 14 in the sliding surface 9 for a ready supply of lubricant to the sliding surface. Opposite to these grooves on the opposite side of the ring recesses 15 are provided in the supporting surface 10, which recesses have a substantially greater peripheral extension than the grooves 14. The oil pressure occurring against the sliding surface 9 in the vicinity of a groove 14 during the rotation of the bearing then causes an elastic flexure of the ring, having its maximum at the groove 14. At that part of the supporting surface 10 remaining between the recesses 15 there will be no flexure of the ring. Hereby a wedge-shaped oil space is provided, extending from the groove 14 to the adjacent remaining part of the supporting surface 10 in which an oil pressure can be built up for taking the thrust load and preventing dry friction between the inner ring 3 and the ring 8.

In order to provide for an effective oil circulation there are grooves 17 at the outer periphery of the ring 8 opposite to each groove 14, which connect the grooves 14 and the recesses 15. Oil is introduced into the bearing through apertures 16 in the side disc 11. It passes the channel 7 and the sliding surface 2 and the groove 14 and sliding surface 9. The oil then passes through the grooves 17 and recesses 15 and finally escapes through apertures 18 in the side discs 11.

The number of grooves 14 and the recesses 15 may vary according to the dimensions of the ring 8, so that the deformation of the ring under oil pressure will be most advantageous for the formation of carrying oil wedges in the sliding surface. A recess 15 is, however, always suitably positioned opposite to a groove 14 if the bearing is intended to be capable of rotation in either direction.

Figure 4 shows the pressure ring 8 laid out in a plane and placed between a rotatable bearing part 20 and a stationary support 21. On the upper side the ring 8 has a sliding surface 9, which is originally plane, and in this sliding surface a groove 14 for supplying lubricant to the sliding surface is provided. On the opposite side of the ring 8 there is a recess 15 of considerable length opposite to the groove 14. The ring 8 bears against the support 21 only with the abutments 22. Now if the bearing member 20 moves over the sliding surface 9, for instance in the direction of the arrow, lubricant is drawn in from the groove 14 between the member 20 and the sliding surface 9 of the ring 8. This ring will then be subjected to a load which deforms the same elastically, as shown in the figure, whereby a wedge-shaped space 23 is formed between the sliding surfaces, in which wedge-shaped space an oil pressure will be built up, which takes the bearing load so that the members 20 and 8 do not come into direct contact with each other.

The bearing according to Figure 5 and Figure 6 comprises an annular upper disc 24 with a lower plane sliding surface 25, a lower disc 26 and an intermediate disc 27, the form of which is illustrated in Figures 7, 8 and 9, is shaped according to the invention with two grooves 14 in the sliding surface 9, positioned diametrically opposite to one another. On the opposite side of the disc are two recesses 15 of such a length that the disc is supported against the lower disc 26 only by the abutments 28, which are consequently displaced 90° relative to the grooves 14. The disc 27 is centered relative to the lower disc 26 by a recess 29. The abutments 28 engage grooves 30 in the lower disc 26 and bear against the bottoms of the same. Owing to the small peripheral width of the abutments 28 the disc 27 can swivel relative to the bottom disc 26 for equalizing the pressure on the two pressure zones arising through the elastic deformation during the rotation of the bearing. The lower disc 26 is provided with two abutments 31, positioned at right angles to the grooves 30 for carrying the lower disc on the supporting member. The two abutments 31 complete a universal support for the intermediate disc 27. The bearing consequently has two pressure zones, one for each groove 14 extending to the nearest abutment 28 in the direction of rotation of the upper disc, between which zones the pressure will be equally divided automatically owing to the universal support of the intermediate disc.

It will be noted that it is possible to modify the embodiments of the invention in a number of ways. Thus the grooves 14 need not extend over the whole radial width of the sliding surface, the sliding surface being relieved in the vicinity of the groove through the deformation of the ring 8. The most reliable lubrication and simplicity in manufacture is, however, attained if the groove is formed substantially as described above. The recesses in the supporting surface of the pressure ring may also be replaced by recesses in the support, provided that the supporting ring is fixed relative to the support, so that the ring is not supported just opposite to the groove in the sliding surface.

Having thus described my invention, I claim and desire to secure by Letters Patent:

1. A plain bearing having a pressure ring of a thickness permitting it to flex under small pressure, for carrying thrust loads, such pressure ring having a sliding surface on one side and a supporting surface on the other side, there being grooves in the sliding surface arranged in pairs with recesses at the supporting surface and extending over substantially the whole radial width of the ring, the recess at the supporting surface having a substantially greater peripheral extent than the corresponding groove in the sliding surface, there being a groove at the outer periphery of the pressure ring, such groove connecting the grooves in the sliding surface with the recesses in the supporting surface.

2. A plain bearing having an inner and an outer bearing ring and a side disc located at the outer ring and a pressure ring of a thickness permitting it to flex under small pressure, for carrying thrust loads, such pressure ring having a sliding surface on one side and a supporting surface on the other side, there being grooves in the sliding surface arranged in pairs with recesses at the supporting surface and extending over substantially the whole radial width of the ring, the recess at the supporting surface having a substantially greater peripheral extent than the corresponding groove in the sliding surface, the pressure ring bearing against the inner bearing ring and abutting against the side disc which in its turn being adapted to abut axially against a housing enclosing the bearing.

3. A plain bearing having an inner and an outer bearing ring and a side disc located at the outer ring and a pressure ring of a thickness permitting it to flex under small pressure, for carrying thrust loads, such pressure ring having a sliding surface on one side and a supporting surface on the other side, there being grooves in the sliding surface arranged in pairs with recesses at the supporting surface and extending over substantially the whole radial width of the ring, the recess at the supporting surface having a substantially greater peripheral extent than the corresponding groove in the sliding surface, there being a groove at the outer periphery of the pressure ring connecting the grooves in the sliding surface with the recesses in the supporting surface, the pressure ring bearing against the inner bearing ring and abutting against the side disc which in its turn being adapted to abut axially against a housing enclosing the bearing.

4. A plain bearing according to claim 2, wherein the pressure ring for taking up the axial load is axially secured between the outer bearing ring and the side disc.

5. A plain bearing having a pressure ring of a thickness permitting it to flex under small pressure, for carrying thrust loads, such pressure ring having a sliding surface on one side and a supporting surface on the other side, there being grooves in the sliding surface arranged in pairs with recesses at the supporting surface and extending over substantially the whole radial width of the ring, the recesses at the supporting surface having a substantially greater peripheral extent than the corresponding groove in the sliding surface, the pressure ring having two recesses in the supporting surface of such peripheral extension that the supporting surface is limited to two mutually diametrically opposed abutments, and the two abutments.

6. A plain bearing according to claim 5, a support for the pressure ring provided on the side turned from the pressure ring with two mutually and diametrically opposed abutments, displaced 90° relative to the abutments of the pressure ring.

7. A plain bearing according to claim 5, there being two diametrically opposed grooves in the sliding surface and two diametrically opposed points of support, the points of support being disposed intermediately of the grooves.

8. A plain bearing having a pressure ring of a thickness permitting it to flex under small pressure for carrying thrust load, such pressure ring having a sliding surface at one side and supporting surfaces at a plurality of limited areas, there being recesses at the said supporting surface between the supporting areas and grooves in the sliding surface arranged in pairs with the recesses, the middle of each of the supporting surfaces being opposite the approximate middle of a sliding surface, such sliding surface projecting a substantial distance over the edges of its appurtenant supporting surface, the recess at such supporting surface having a substantially greater peripheral extent than the corresponding groove in the sliding surface and the sliding surface presenting a continuous unbroken surface extending from the groove opposite one recess over the supporting area to the groove of the adjacent recess.

9. A plain bearing having a pressure ring for carrying thrust loads, the said pressure ring having a sliding surface on one side, there being at least two grooves in the sliding surface arranged transversely thereof, the pressure ring engaging one side of an annular supporting member at two diametrically opposed limited areas intermediate of the grooves, means for supporting the other side of the said supporting member at two diametrically opposed limited areas displaced 90° relative to the two first mentioned supporting areas.

10. A plain bearing having a pressure ring of a thickness permitting it to flex under small pressure for carrying a thrust load, such pressure ring having a sliding surface on one side and a supporting surface on the other side, there being grooves in the sliding surface and a support for the pressure ring, the said pressure ring engaging the said support at a plurality of separate limited areas, there being spaces between the pressure ring and its support between the said abutment areas, the said spaces being arranged in pairs with the grooves in the sliding surface and having greater peripheral extent than the corresponding grooves in the sliding surface, there being two spaces of such peripheral extension that the supporting surface is limited to two mutually diametrically opposed abutments.

11. A plain bearing having an inner and an outer bearing ring, a side disc engaging the outer bearing ring, a pressure ring of a thickness permitting it to flex under pressure for carrying thrust loads, such pressure ring having a sliding surface on one side cooperating with a sliding surface on the inner bearing ring, there being means for supporting the pressure ring at a plurality of separate limited areas and for transmitting thrust from the pressure ring to the side disc.

12. A plain bearing having an inner and an outer bearing ring, a side disc engaging the outer ring and a pressure ring of a thickness permitting it to flex under pressure for carrying thrust loads, such pressure ring having a sliding surface on one side cooperating with a sliding surface on the inner bearing ring and having a supporting surface supported at a plurality of separate limited areas, the organization being such that thrust is transmitted from the inner ring to the side disc, the side disc being adapted to transmit the thrust to a housing enclosing the bearing.

NILS ARVID PALMGREN.